W. & H. W. NOYES.

Improvement in Device for Softening Comb-Blanks.

No. 126,154. Patented April 30, 1872.

WITNESSES
Franklin Parker
L. A. Power

INVENTORS
William Noyes
Herbert W. Noyes
per William Edson

UNITED STATES PATENT OFFICE.

WILLIAM NOYES AND HERBERT W. NOYES, OF NEWBURYPORT, MASS.

IMPROVEMENT IN DEVICES FOR SOFTENING COMB-BLANKS.

Specification forming part of Letters Patent No. 126,154, dated April 30, 1872.

*To all whom it may concern:*

We, WILLIAM NOYES and HERBERT W. NOYES, of Newburyport, in the county of Essex and State of Massachusetts, have invented a certain new and useful Device for Softening Comb-Blanks, of which the following is a specification:

The Nature and Object of the Invention.

The nature of our invention consists in constructing a rack for comb-blanks, the said rack embracing or contacting with the parts of the blank from which the teeth are cut, and in keeping the contacting parts of the rack saturated with water or any other suitable fluid. These racks may be constructed of any suitable hygroscopic material. The object of the invention is to keep that part of the comb-blanks that is to be cut into teeth in proper condition to work, and also to keep the body of the comb dry and in shape.

Description of the Accompanying Drawing.

Figure 1:
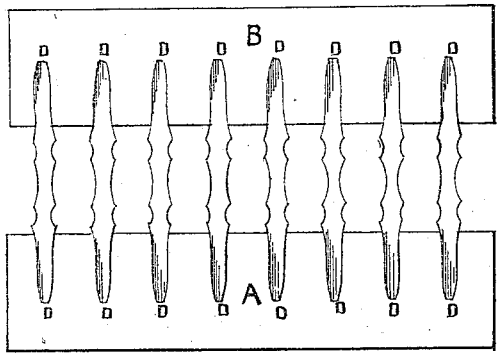
Figure 2:
Figure 3:
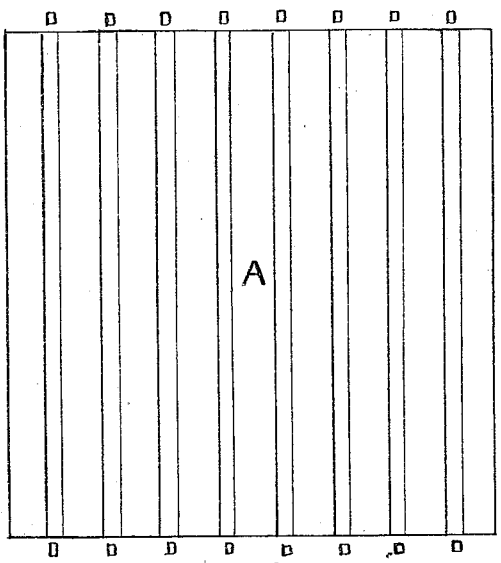

Fig. 1 shows one of my comb-racks in elevation; also shows an end view of the comb-blanks. Fig. 2 shows a plan and section of one of the comb-blanks. Figure 3 shows a plan of one of the pieces forming the rack.

General Description.

The rack is formed of two blocks, A B, shown in elevation at Fig. 1, and in plan in Fig. 3. Each of the blocks A B is made with channels or grooves D D, Figs. 1 and 3, of sufficient depth and width to receive that part of the blank from which the teeth are to be sawn. When the blank is in the rack all that part that lies between the line S' T, Fig. 2, and the edge, is in contact with or close proximity to the material of which the rack is made, so that if such material is saturated with moisture then that part of the blank that is in contact with it must also be moist, and consequently in good condition for working.

The rack may be made of any suitable porous or hygroscopic material, it being only essential that it shall, as a whole or in part, retain moisture.

We claim as our invention—

The moisture-saturated rack A B, arranged substantially as described, and for the purpose set forth.

WILLIAM NOYES.
HERBERT W. NOYES.

Signed in presence of—
ELIPHALET GRIFFIN,
NATHL. PIERCE.